Sept. 21, 1954 J. M. HOLLYWOOD 2,689,880

COLOR TELEVISION

Filed April 21, 1951 3 Sheets-Sheet 1

INVENTOR
John M. Hollywood
BY Rennie, Edmonds, Morton, Barrows and Taylor
ATTORNEYS Sept. 21, 1954 J. M. HOLLYWOOD 2,689,880

COLOR TELEVISION

Filed April 21, 1951 3 Sheets-Sheet 2

INVENTOR
John M. Hollywood
BY Pennie, Edmonds, Morton, Barrows and Taylor
ATTORNEYS INVENTOR
John M. Hollywood
BY Pennie, Edmonds, Morton, Barrows and Taylor
ATTORNEYS Patented Sept. 21, 1954 2,689,880

UNITED STATES PATENT OFFICE 2,689,880

COLOR TELEVISION

John M. Hollywood, Forest Hills, N. Y., assignor to Columbia Broadcasting System, Inc., New York, N. Y., a corporation of New York Application April 21, 1951, Serial No. 222,204

9 Claims. (Cl. 178—5.4)

This invention relates to color television and more particularly to the provision in color television receivers of means to effect and preserve proper phasing between the devices employed at the transmitter and receiver to scan and reproduce the object field in a plurality of colors. The invention provides means which extract from the received signal special signal components added for the purpose of color phasing and which permit control of the phase of the color selecting device in the receiver by such extracted components while insuring against response to spurious signals and minimizing disturbance of the horizontal and vertical scanning circuits in the receiver.

In field sequential systems of color television for example both transmitter and receiver include devices for associating successively different colors in a cyclical order with successive image fields which are scanned at the transmitter and reproduced at the receiver. In one known system of field sequential color television, color filter wheels are provided at the transmitter and receiver for this purpose. The color filter wheels have one or more sets of differently colored transparent filter sectors, each set including one sector for each color in the system of color composition being employed. A filter of a given color is interposed at the transmitter between the object being televised and the sensitive surface of the pickup tube during the scanning of one image field, producing what may be called by analogy with color photography a color separation field corresponding to the luminosity in one color present in the object field being televised. While this image field is being reproduced at the receiver, a filter sector of the same color must be presented in front of the receiver viewing tube. Alternatively it has been proposed to employ at the receiver a tube having a number of separate fluorescent screens, arranged to exhibit luminescence of different colors. For the successive image fields the electron beam is shifted from one to another of these screens. In receivers of this type the means which successively select the different screens for excitation must also be properly phased with the color selecting device at the transmitter.

Correct phasing of the transmitter and receiver color associating devices to exhibit at the receiver the same color as that being scanned at the transmitter may be termed color phasing, and it is with the production and preservation of such color phasing that this invention is concerned.

The invention will now be described in detail in terms of a preferred embodiment thereof by reference to the accompanying drawings in which Fig. 1 is a series of waveforms, idealized in shape, illustrating the operation of the invention at the receiver in terms of the embodiment shown in Figs. 2 and 3;

Figure 4:
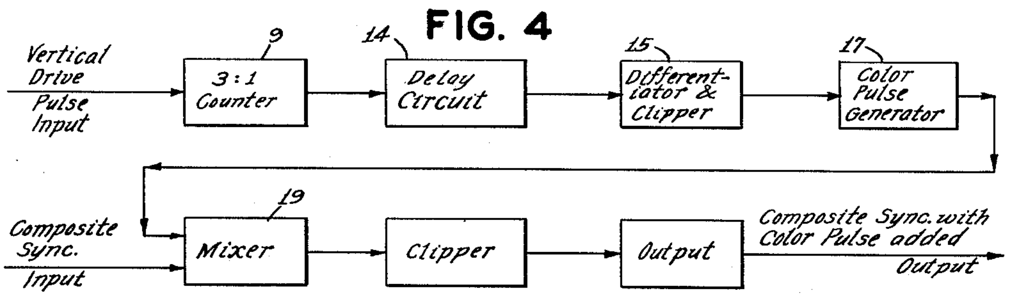
Figure 5:
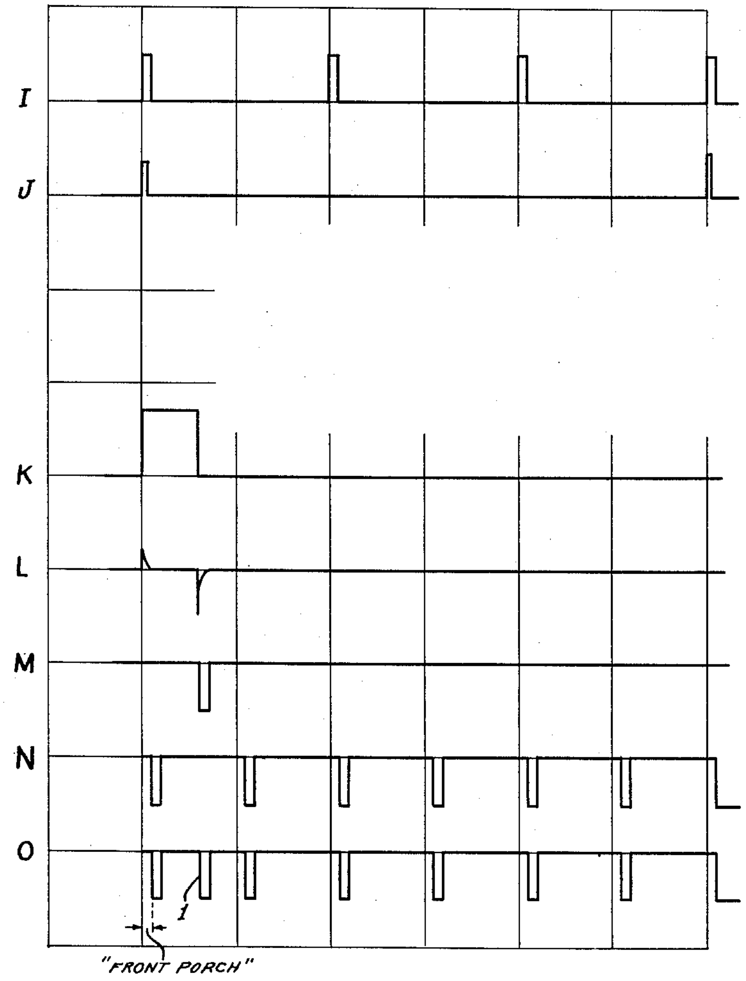

Fig. 4 is a block diagram illustrating components which may be employed at the transmitter in order to generate a suitable color phasing signal for the operation of the receiver circuits of the invention, and Fig. 5 is a series of waveforms again idealized in shape illustrating the derivation of the color phasing signal at the transmitter by the components of Fig. 4 and its combination with the other synchronizing components of the radiated signal.

Figure 1:
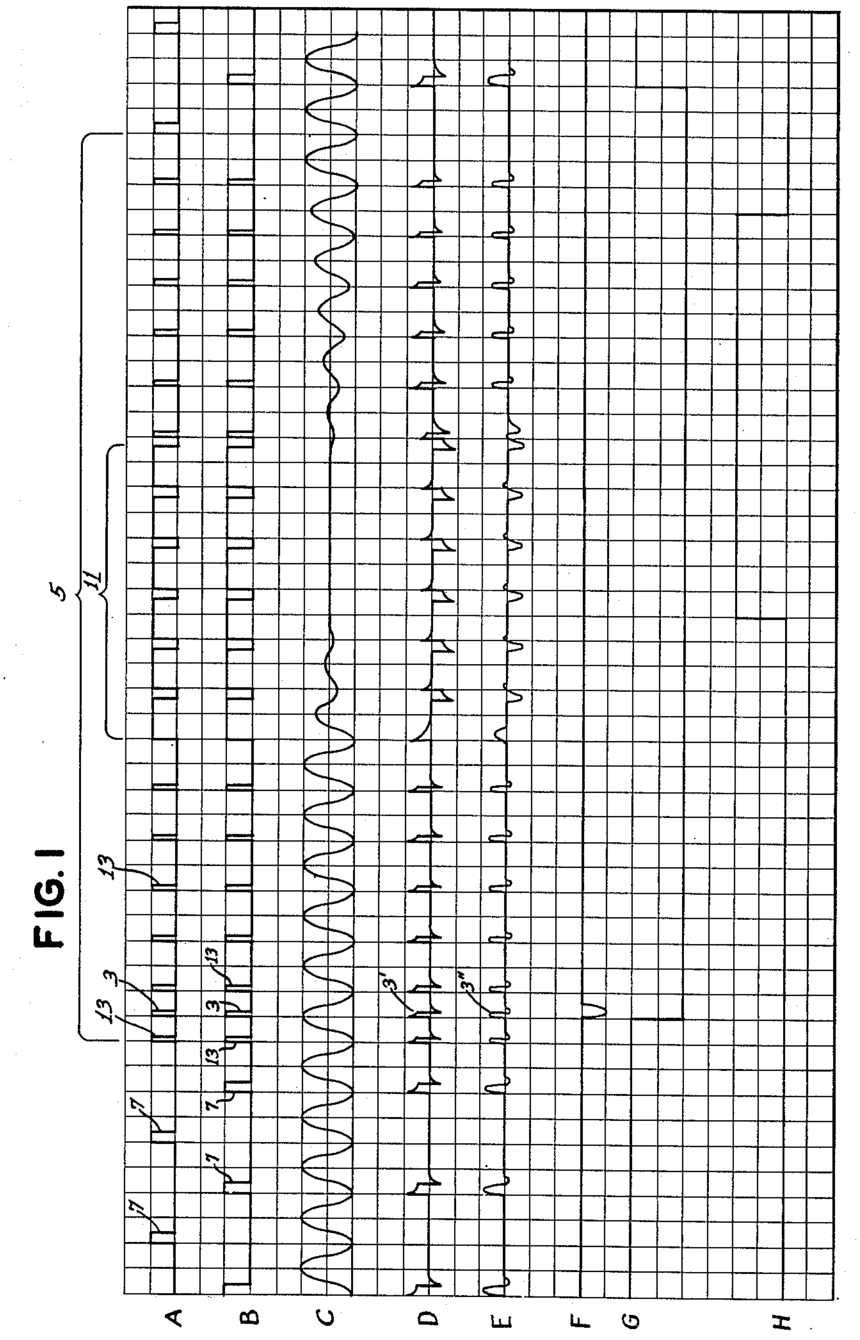

Fig. 1 illustrates the application of the invention to a field sequential system of color television. According to the invention as applied to field sequential systems, correct phasing of the color selecting device at the receiver is made possible by including in the transmitted signal a pulse or series of pulses for each image field to be identified as to color. It is usually sufficient to identify only one image field in each color field, i. e. group of of image fields including one field of each color in the color composition system employed. Indeed the receiver color associating or selecting device may have sufficient memory or momentum to maintain correct color phase with color phasing pulses applied at even longer intervals.

The color phasing pulse or pulses for each image field to be identified as to color are added to the transmitted signal preferably at a fixed phase with respect to some characteristic feature of the vertical synchronizing signal. In the preferred embodiment to be described in detail herein a single color phasing pulse is used, and the characteristic feature selected is one of the equalizing pulses which precedes or follows the vertical synchronizing pulse.

In Fig. 1 waveforms A and B represent respectively the synchronizing components of the received waveform for two fields of a two-to-one interlaced frame in an odd line interlaced scanning pattern, together with color phasing pulses 3 suitable for operation of the receiver circuits of the invention.

The contents of waveforms A and B may be assumed to have been separated from the picture content of the received signal by any of the means known to the art.

The waveforms A and B of Fig. 1 are not from successive image fields, since the color phasing signal is applied only at color field frequency. For purposes of illustration there will be assumed a three-color color composition system in which the color phasing signal is applied at color field frequency, i. e. at every third field, so that waveforms A and B represent the synchronizing components of fields which are separated by two intervening fields. Waveforms A and B do however represent the two fields of the double interlaced scanning frame.

In waveforms A and B, horizontal synchronizing pulses 7 succeed each other at line frequency, those of waveforms A and B being displaced with respect to each other in the drawing by half the length of one line in accordance with the convention by which the vertical blanking and synchronizing pulses of the two fields of a frame are shown superposed. Actually of course the horizontal synchronizing pulses of the two fields shown are part of a single continuous series, the two vertical blanking and synchronizing pulses being separated by $n+\frac{1}{2}$ line periods, $n$ being an integer. Each of the waveforms A and B includes a vertical blanking pulse 5, here shown as nine lines long, by reference to which the color phasing pulses 3 may be conveniently generated at the transmitter, as will be described in connection with Fig. 4. Each blanking pulse also carries a vertical synchronizing pulse 11, three line periods long, preceded and followed by six equalizing pulses 13 occurring at double the line frequency. As is customary, the vertical synchronizing pulses are serrated at double the line frequency in order to permit maintenance of line synchronization.

Except for the color phasing pulses 3, waveforms A and B are similar to the standard synchronizing waveforms now adopted in the United States by the Radio Manufacturers Association and illustrated for example at page 22 of Television Standards and Practice, D. G. Fink, editor, 1943. It will be understood that inasmuch as the field frequency for field sequential color television is higher than that for black-and-white, the pulses in waveforms A and B will be shorter than for black and white television. The invention is of course however not restricted to use with this synchronizing waveform.

The utilization according to the invention at the receiver of the color phasing pulses 3 is illustrated in waveforms C—H of Fig. 1, all of which are derived from waveform B. The embodiment of the invention shown in detail in Fig. 3 operates with color phasing pulses spaced halfway between equalizing pulses, as shown in Fig. 1. Fig. 1 further shows the color phasing pulses between the first two equalizing pulses on the vertical blanking pulse of the fields to which color phase identification is applied. This is advantageous in order to avoid interference with the normal operation of the vertical synchronizing pulse separation circuits in the receiver. The circuit of Fig. 3 however can be used with color phasing pulses disposed between other pairs of equalizing pulses, if desired.

Figure 2:
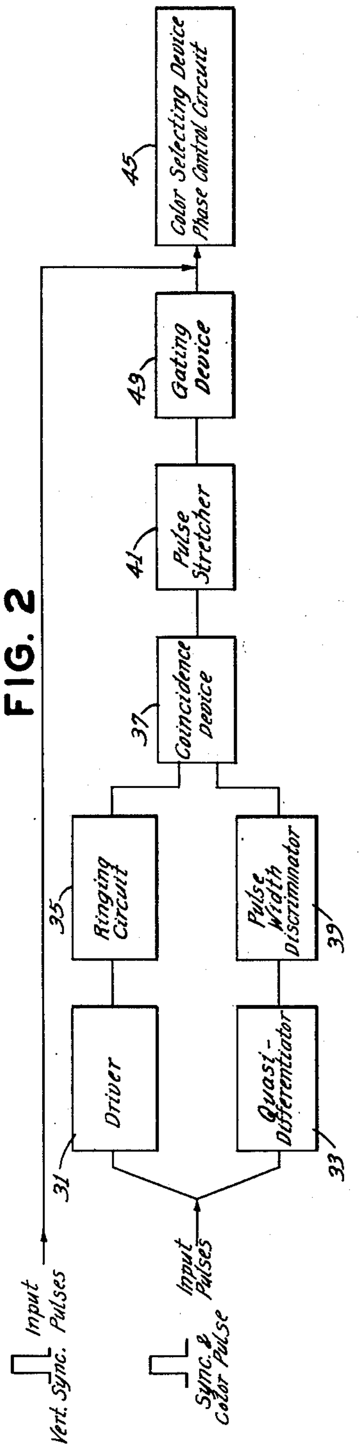
Fig. 2 is a block diagram of a preferred embodiment of the invention.
Figure 3:
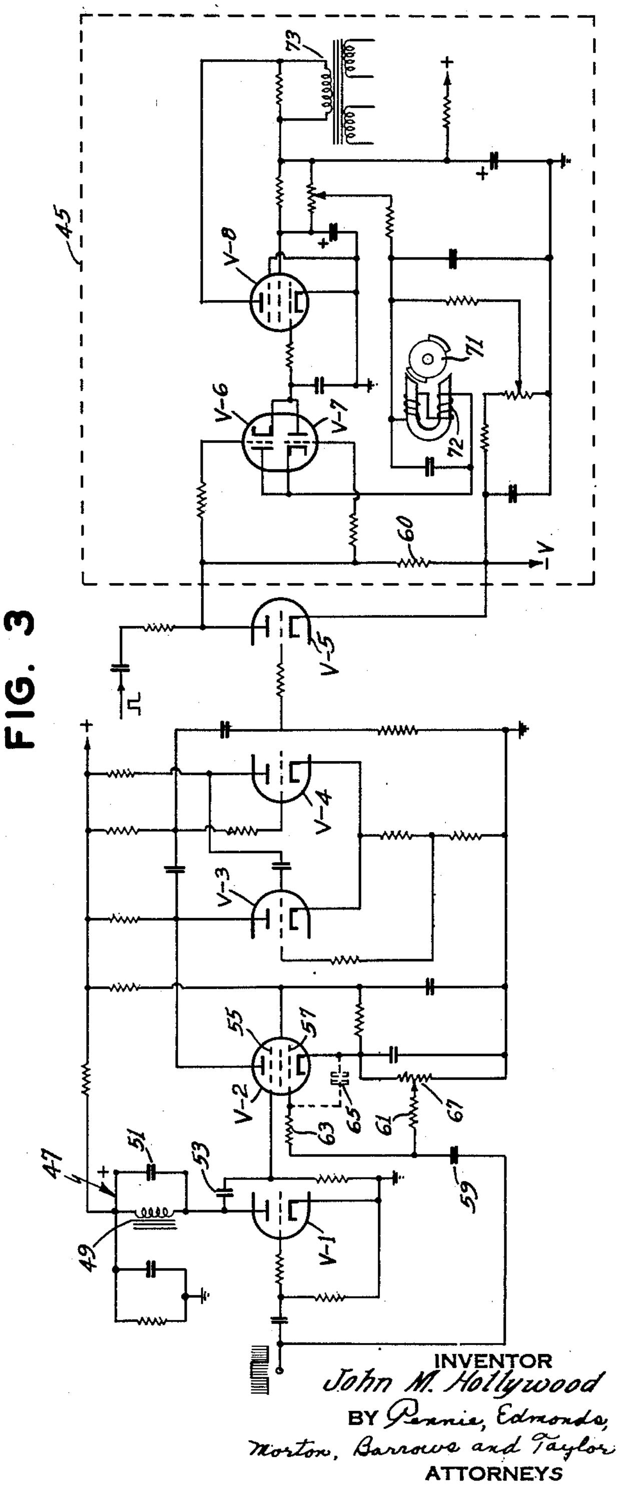
Fig. 3 is a schematic diagram of a preferred embodiment of the invention consistent with the embodiment shown in block diagram form in Fig. 2.

The invention provides means for separating out and utilizing the received color phasing pulses such as pulses 3 of Fig. 1, and a preferred embodiment of the invention is illustrated in Fig. 2 and in further detail in Fig. 3. For the separation of the color phasing pulses from other components of the synchronizing wave as received, the synchronizing wave is applied simultaneously to a driving stage 31 and to a quasi differentiating circuit 33. The driving stage 31 includes an amplifier tube which controls operation of a ringing circuit 35 which produces oscillations having a period half as long as the interval between horizontal synchronizing pulses and equal to the interval between equalizing pulses, as shown in wave-form C of Fig. 1. The oscillations in the ringing circuit are due to the variations in current in the amplifier tube. These variations appear at line frequency during the interval between vertical blanking pulses and at double the line frequency during the vertical equalizing pulses. The voltage output of the ringing circuit is applied to a coincidence device 37 to which is likewise applied the received synchronizing waveform after subjection to incomplete differentiation in the quasi differentiator 33 and to integration in a pulse width discriminator 39. As will be further described in connection with Fig. 3 the quasi differentiator is intended to prevent false operation of the coincidence device 37 by long pulses such as the serrated vertical synchronizing pulses themselves, and the pulse width discriminator 39 through its integrating action similarly prevents false operation of the coincidence device in response to short noise or other spurious signals.

The driver 31, ringing circuit 35 and coincidence device 37 thus operate to forward to a pulse stretcher 41 only those pulses which come through the differentiator and pulse width discriminator half an equalizing pulse period after the arrival of an equalizing pulse.

A pulse stretcher 41 and gating device 43 are added to provide additional security against the admission of false signals to the color selecting device phase control circuit 45.

Together the elements 41 and 43 employ the output of the coincidence device 37 to gate through to the control circuit 45 at color field frequency a locally available signal of field frequency and fixed phase such as the vertical synchronizing pulse. Functionally therefore a control signal is passed to the control circuit 45 only when the pulse pair which opens the coincidence device occurs at or immediately prior to the vertical synchronizing pulse.

Fig. 3 illustrates schematically a circuit responding to the requirements of Fig. 2.

In Fig. 3 the locally received synchronizing signal as illustrated in waveforms A and B of Fig. 1 is applied with positive polarity to a driver amplifier stage V–1 having a ringing circuit generally indicated at 47 in its plate V–1 corresponds to the driver 31 of Fig. 2 and the circuit 47 to that of 35 of Fig. 2. The ringing circuit includes an inductance 49 with a suitable capacitor 51 in parallel therewith and is tuned to oscillate at twice the line frequency of the scanning pattern employed, i. e. at the equalizing pulse frequency. With each horizontal synchronizing pulse applied to the grid of V–1 its plate voltage executes a negative excursion so that the oscillations in the circuit 47 occurring at twice line frequency are phased with respect to the horizontal synchronizing pulses and with respect to the equalizing pulses preceding the vertical synchronizing pulse as shown in Fig. 1, where waveform C has its negative maxima at the times of the horizontal synchronizing and equalizing pulses in waveform B. Waveform C is therefore representative of the alternating voltage on the plate of V–1.

Throughout the duration of the equalizing and line synchronizing pulses, i. e. between the occurrences of vertical synchronizing pulses, waveform C may be of substantially constant amplitude. When the longer vertical synchronizing pulses appear (pulses 11 of Fig. 1), the tube V–1 conducts for so large a fraction of the line period that the oscillations in the circuit 47 are largely damped out.

A coupling condenser 53 applies waveform C on the plate of V–1 to the suppressor grid of a pentode V–2 corresponding to the coincidence device 37 of Fig. 2. V–2 is so biased both on its control and suppressor grids that plate current can flow only when the ringing voltage of waveform C is at its most positive value and when a positive pulse is simultaneously applied to its control grid.

The received synchronizing signal is applied to the control grid of V–2 through a capacitor 59 and a resistor 63. The capacitor 59 and a resistor 61 connecting with the cathode of V–2 through the bias resistor 67 together function as a quasi differentiating circuit which operates on the color phasing pulses in the manner illustrated in waveform D deriving from the color phasing pulse 3 a modified pulse 3'. Capacitor 59 and resistor 61 are chosen to have such time constant that the color phasing pulse 3, here represented as having the same width as the equalizing pulses 13, does not permit the upper plate of the capacitor 59 to return to its steady state potential before the trailing edge of the color phasing pulse arrives. While a complete differentiating action would be desirable to prevent conduction in the tube V–2 by long pulses, the discrimination to be provided against high frequency random signals by means of an integrating circuit presently to be described renders the use of complete differentiation less desirable in general. If such discrimination is not considered necessary, however, complete differentiation may be employed if desired. The attenuation of the oscillations in the circuit 47 which occurs when plate current flows continuously in V–1 for a major fraction of the cycle of that circuit makes such complete differentiation ordinarily unnecessary, as may be seen by inspection of waveform C at the time of the serrated vertical synchronizing pulse in waveform B.

The resistor 63 connected in series with the grid of V–2 operates in conjunction with the grid-to-cathode capacitance of V–2 (here illustrated as a phantom capacitor 65), to effect an integrating action as illustrated by waveform E. Sharp noise pulses may be expected to be of a duration so much shorter than that of the color phasing pulse that their integrated effect will be insufficient to raise the control grid above cutoff.

The color phasing pulses 3 however even after quasi differentiation into the shape of waveform D, contain sufficient energy to produce on the control grid 57 of V–2 the substantial pulse illustrated at 3'' in waveform E. The simultaneous appearance of pulse 3'' on the control grid 57 and of the positive loop of waveform C on the suppressor grid 55 of V–2 produces in that tube a pulse of plate current which results in the negative voltage pulse shown as waveform F, occurring only once for each color phasing pulse received.

The pulse of waveform F while available directly for controlling the phase of the receiver color changing device, is in a preferred embodiment of the invention used only indirectly for that purpose. As an additional safeguard against the use for color phase comparison and control purposes of false signals such as might appear at the right time to cooperate with waveform C and as might have the right shape to pass through the quasi differentiating circuit and integrating circuit which have been described, the embodiment of the invention illustrated utilizes waveform F to develop a gating waveform G which is then employed to admit, at color field frequency, the locally amplified vertical synchronizing pulse or some similar pulse of image field frequency to the color selecting device phase comparison and control circuit proper.

To this end the separated color phasing pulse of waveform F is applied to a pulse stretching device which takes the form of the monostable multivibrator V–3, V–4. V–4 is the normally conducting tube in the multivibrator. The negative voltage pulse on the plate of V–2 is coupled to the grid of V–4, initiating a change in the conducting phase of the multivibrator illustrated in waveform G which represents the voltage on the plate of V–3.

Waveform G therefore constitutes a negative gating voltage whose length can be controlled by adjustment of the time constants in the multivibrator which govern the return thereof to its stable phase of conduction.

Waveform G is applied to the grid of a gating tube V–5 which corresponds to the gating device 43 of Fig. 2. V–5 is operated at substantially zero or at a positive grid bias. In the absence of a negative pulse on its grid, V–5 has a low plate-to-cathode impedance. Positive signals applied to its plate are therefore greatly attenuated and appear at low amplitude at the phase detector double tube V–6, V–7 in the color changing device phase control circuit generally indicated at 45, since tube V–5 substantially short-circuits the input resistor 60 of the phase control circuit. If on the other hand the negative gate of waveform G is present on the grid V–5, positive signals applied to the plate of V–5 pass on with full amplitude to V–6, V–7 and permit effective comparison of phase. A suitable positive signal of field frequency may be applied to the plate of V–5 from the output tube of the vertical scanning amplifier (not shown) for example.

For purposes of illustration there is shown in Fig. 3 a color selecting device phase control circuit 45 adapted for use with a color television receiver in which the color selecting device is a filter wheel. The wheel may be assumed to include two sets of color filters, one revolution of the wheel corresponding to two color fields. Coupled to the color filter wheel at unity drive ratio is an alternator 71 which generates a signal representative of the phase of the color filter wheel. The alternator 71 includes two poles and consequently develops across its armature winding 72 a pulse of voltage for each half revolution of the color filter wheel. Phase comparison is made in the tube V–6, V–7 between the vertical scanning pulses selected at the gating tube V–5 and the signals developed by the alternator 71. The output of the phase detector V–6, V–7 is applied to a control tube V–8, the plate current of which flows through a saturable reactor 73 having windings in series with those of the color filter wheel driving motor. Initial adjustment is made for correct color field phasing of the color filter wheel by angularly positioning the alternator 71 to produce a predetermined normal output from the phase comparator V–6, V–7. If in operation an error in color field phase develops, the current in the saturable reactor 73 changes in the direction required to speed up or slow down the color filter driving motor as required to bring the color filter wheel into proper phase. An initial incorrect speed of the driving motor will be likewise corrected. Feedback voltage from the screen grid of V-8 is utilized to minimize hunting. This circuit and improvements thereon are described in detail in application Serial No. 204,769 filed January 6, 1951, by John W. Christensen for "Color Television."

The generation of the color phasing pulses at the transmitter will now be briefly described with reference to Figs. 4 and 5. In the block diagram of Fig. 4, a counter 9 is shown receiving as input the vertical blanking pulse derived from the transmitter synchronizing generator, not shown. The vertical blanking pulse is illustrated in waveform I of Fig. 5, recurring at field frequency. In a three-color system such as is now the preferred one in field sequential color television systems, the counter 9 will divide the vertical driving pulses by a factor of three producing one output pulse for every third blanking pulse (waveform J, Fig. 5). The pulses J, of color field frequency, are passed to a delay circuit 14 which may for example take the form of a monostable delay multivibrator. The delay circuit 14 generates a waveform illustrated at K in Fig. 5 whose trailing edge is suitably delayed with respect to the beginning of the pulse in waveform I.

In Fig. 5 the time scale for waveforms K and following is expanded with reference to that of waveforms I and J. Whereas in waveforms I and J two divisions of the horizontal time scale represent the duration of one image field, in waveforms K to O two divisions represent the length of one horizontal line, and the six negative pulses shown in waveform N are the six equalizing pulses at double the line frequency which in the standard television synchronizing signal precede the vertical synchronizing pulse, shown fragmentarily at the right.

The delay circuit 14 is adjusted to produce a rectangular waveform illustrated at K in Fig. 5 having such a duration that its trailing edge occurs at the desired position in the vertical synchronizing pulse cycle. In the embodiment shown this position has been chosen as the midpoint between the two first equalizing pulses preceding the vertical synchronizing pulse, due regard being had for the "front porch" interval indicated in waveform N between the beginning of the vertical blanking pulse and the first equalizing pulse.

A differentiating and clipping circuit 15 accepts waveform K from the delay circuit 14. The differentiated and clipped product of the circuit 15 is illustrated in waveform L, the positive spikes having been discarded by clipping action. A color pulse generating circuit 17, which may again take the form of a monostable delay multivibrator, generates from waveform L a color phasing pulse illustrated in waveform M.

The composite synchronizing signal (horizontal and vertical synchronizing and blanking pulses) is brought from the synchronizing generator to a mixing stage 19 where the color phasing pulse of waveform M is added to provide waveform O, in which there appear at every third field a color phasing pulse 1.

In the embodiment of the invention which has been described, the complete received synchronizing waveform has been applied to the color pulse extractor, i. e. to the oscillatory circuit and to the matching device, and the oscillations of the oscillatory or ringing circuit prior to the appearance of the color phasing pulse have been shown as resulting as much or more from the line synchronizing pulses as from the equalizing pulses, which latter are of fixed phase with reference to the color phasing pulse whereas the former are not. It is clear from waveform C in Fig. 1 however that the equalizing pulses alone may suffice to bring the oscillatory circuit of the pulse extractor into the proper state of oscillation. By suitable adjustment of the bias conditions in the matching device (tube V-2 of Fig. 3) a color phasing pulse between the last two equalizing pulses following the vertical synchronizing pulse may be employed instead, without applying to the circuit of Fig. 3 anything more than the signals which are superposed on the vertical blanking pulse. Conversely it is sufficient to utilize for the excitation of the oscillatory circuit line synchronizing pulses alone. Since the vertical blanking and synchronizing pulses appear at most at two phases with respect to the line synchronizing pulses, a pulse generated at fixed phase with respect to the vertical blanking pulse can be so positioned as to appear always at the same phase with respect to an oscillation at double the line frequency. According to the method employed therefore one or another portion of the complete synchronizing signal may be removed prior to application to the pulse extracting circuit of the invention.

While the gating circuit described in connection with Figs. 2 and 3 is an element of my invention in its preferred form, my invention in its broader aspects comprehends the basic requirements of color phasing whereby assurance is obtained that a chosen color rather than another color will be associated in the receiver with the portion of the reproduced image which is scanned in the chosen color at the transmitter. Consistently with the object and achievement of my invention, the precise adjustment of the initiation and termination of the presentation of a chosen color with the initiation and termination of reproduction of the appropriate portion of the received image may be left to other circuits. Thus, in terms of the embodiment which has been described, the proper extraction of the color phasing pulse is itself sufficient to insure that a red filter for example is inserted in front of the receiver viewing tube while a red color separation field is being generated at the transmitter. Hence the extracted color phasing pulse, after suitable amplification if necessary, may be used directly to control the operation of the motor speed control circuit, rather than indirectly by controlling the application of field synchronizing signals thereto. In general, other signals available within the receiver regardless of the presence or absence of the color phasing pulses utilized by the invention may be used, outside and independently of the circuits of the invention, to insure in the narrow sense the precise adjustment by which the leading and trailing edges of a red filter for example are adjusted with reference to the progress of the scanning process in the receiver so that the last lines of a red field are rendered in red and the first lines of the next succeeding field are rendered in the color appropriate to that field.

I claim:

1. In a color television system employing color video signals in fixed time relationship with a synchronizing signal which includes recurring groups of short pulses of predetermined periodicity and color synchronizing pulses recurring with selected groups of said short pulses, said color synchronizing pulses having fixed spacings between said short pulses, receiver means to control the synchronization of receiver color changing devices which comprises an oscillatory circuit supplied with said synchronizing signal and tuned with respect to the periodicity of said short pulses to produce resonant oscillations of fixed phase therewith and having antinodes during the occurrence of said color synchronizing pulses, a coincidence circuit supplied with the output of said oscillatory circuit and with said synchronizing signal for producing a control signal only upon the coincidence of an antinode in the oscillations of said oscillatory circuit and a color synchronizing pulse in said synchronizing signal, and means utilizing said control signal to control the synchronization of the receiver color changing device.

2. In a color television system employing color video signals in fixed time relationship with a synchronizing signal which includes recurring groups of short pulses of predetermined periodicity and color synchronizing pulses recurring with selected groups of said short pulses, said color synchronizing pulses being spaced equidistant between two of said short pulses, receiver means to control the synchronization of the receiver color changing devices comprising an oscillatory circuit tuned to the periodicity of said short pulses, an amplifier tube having two control electrodes, a coupling between the oscillatory circuit and one of said control electrodes, a source of said groups of short pulses and of said color synchronizing pulses coupled to the oscillatory circuit and to the other of said control electrodes, whereby a change of current is produced in said amplifier tube only upon the coincidence thereat of an antinode in the oscillations of said oscillatory circuit and of a pulse halfway between an adjacent pair of said short pulses, and means utilizing the output of said amplifier tube to control the synchronization of the receiver color changing device.

3. In a color television system employing a synchronizing signal which includes recurring groups of short pulses of predetermined periodicity and color synchronizing pulses recurring with selected groups of said short pulses, said color synchronizing pulses recurring halfway between adjacent pulses in said selected groups, receiver means to control the synchronization of the receiver color changing device comprising an oscillatory circuit tuned to the periodicity of said short pulses, a coupling applying said short pulses and color synchronizing pulses to the oscillatory circuit, an amplifier tube having two control grids, a coupling between the oscillatory circuit and one of said grids, a coupling applying said short pulses and color synchronizing pulses to the other of said grids, said grids being so biased that a change in plate current occurs in said amplifier tube only upon the coincident arrival thereat of signals on both of said grids, and means utilizing the output of said amplifier tube to control the synchronization of the receiver color changing device.

4. In a color television system employing a synchronizing signal which includes periodically recurring groups of short pulses of predetermined periodicity and color synchronizing pulses recurring with selected groups of said short pulses halfway between adjacent pulses in said selected groups, receiver means to separate out said color synchronizing pulses from the received signal comprising an oscillatory circuit tuned to the interval of said short pulses, means to excite the oscillatory circuit with said short pulses, an amplifier tube having two control grids separately biased to cutoff, a coupling between the oscillatory circuit and one of said grids, and means to apply said short pulses and color phasing pulses to the other of said grids.

5. In a color television system employing a synchronizing signal which includes pulses at field frequency on which are superposed a plurality of periodic pulses of frequency high by comparison to said field frequency and in which color phasing pulses are superposed on selected ones of said field frequency pulses midway between adjacent high frequency pulses thereon, means to extract said color phasing pulses comprising an oscillatory circuit tuned to the frequency of said high frequency pulses, an amplifier tube having two grids separately biased to cutoff, means to apply to the oscillatory circuit and to one of said grids the pulses superposed on the field frequency pulses, and a coupling between the oscillatory circuit and the other grid of said tube.

6. In a color television system employing a synchronizing signal which includes pulses at line frequency and pulses at field frequency, said field frequency pulses recurring at intervals equal to half of an odd number of line periods, and in which color phasing pulses are added to selected field frequency pulses an integral number of half line periods after the beginning of such field frequency pulses, means to extract said color phasing pulses comprising an oscillatory circuit tuned to one-half the line frequency, an amplifier tube having two grids separately biased to cutoff, means to apply the line frequency and color phasing pulses to the oscillatory circuit and to one of the grids of said tube, and a coupling between the oscillatory circuit and the other of said grids.

7. In a system of field sequential color television in which the synchronizing signal includes at color field frequency a color phasing pulse spaced halfway between two equalizing pulses on the vertical blanking pulse and in which the receiver includes a device adapted to associate successively different colors with successive image fields in a cyclical order, means to control the phase of said color associating device comprising an oscillatory circuit tuned to the frequency of the equalizing pulses, an amplifier tube having two control grids, means to apply the equalizing pulses and color phasing pulses to the oscillatory circuit and to one of the grids of said tube, a coupling between the oscillatory circuit and the other grid of said tube, phase comparison and correcting means receiving as one input a signal representative of the phase of said color associating device, and a coupling adapted to apply to said phase comparison and correcting means a signal representative of the signal on the plate of said amplifier tube.

8. In a system of field sequential color television in which the transmitted synchronizing signal includes at color field frequency a color phasing component of fixed phase with respect to the vertical synchronizing pulse, receiver means to control the phase of the receiver field color changing device comprising a first amplifier tube to which all received synchronizing signals are applied, an oscillatory circuit coupled into the plate current path of the first tube tuned to twice the interval between the color phase component and the adjacent component of the received synchronizing signal, a second amplifier tube having a grid coupled to the oscillatory circuit and having the received synchronizing signal applied to a second grid, a gating circuit adapted to be opened by the output of the second amplifier tube to a signal of field frequency, and means to compare and correct the phase of the gated vertical synchronizing pulse component with respect to the phase of the receiver field color changing device.

9. In a system of field sequential color television in which the transmitted synchronizing signal includes a color phasing pulse at color field frequency spaced halfway between two equalizing pulses on the vertical blanking pulse of the fields in which it appears and in which the receiver includes color associating means adapted to associate successively different colors with successive image fields in a cyclical order, means to control the phase of said color associating means comprising a driver stage, an oscillatory circuit in the plate current path of the driver stage tuned to the frequency of said equalizing pulses, means to apply the received synchronizing signal simultaneously to the driver stage and to differentiating and integrating circuits in series, the time constants of said differentiating and integrating circuits being respectively at least as long as and no longer than said color phasing pulses, a matching stage separately biased to cutoff on two of its grids having one of said grids coupled to the plate of the driver stage and the other coupled to the output of the integrating circuit, a monostable multivibrator having a normally conducting tube, a coupling between the grid of the normally conducting tube and the plate of the matching stage, a gating stage having a control grid coupled to the grid of the normally conducting tube of the multivibrator, a source of signals of field frequency coupled to the gating stage, and a phase detector to which are applied the output of the gating stage and a signal representative of the phase of the color associating device for controlling the synchronization of said color associating means.

References Cited in the file of this patent

UNITED STATES PATENTS

| Number | Name | Date |
|---|---|---|
| 2,378,746 | Beers | June 19, 1945 |
| 2,502,195 | Wood | Mar. 28, 1950 |
| 2,539,440 | Labin | Jan. 30, 1951 |
| 2,546,972 | Chatterjea | Apr. 3, 1951 |